US005388208A

United States Patent [19]

Weingartner et al.

[11] Patent Number: 5,388,208

[45] Date of Patent: Feb. 7, 1995

[54] GERBIL WHEEL MEMORY

[75] Inventors: Thomas A. Weingartner; Paul J. Short, both of Albuquerque, N. Mex.; Paul E. Knight, Streamwood, Ill.; Jennifer A. Graves, Mesa, Ariz.

[73] Assignee: Honeywell Inc., Minneapolis, Minn.

[21] Appl. No.: 985,975

[22] Filed: Dec. 4, 1992

[51] Int. Cl.[6] .............................................. G06F 12/02

[52] U.S. Cl. ..................................................... 395/165

[58] Field of Search ....................... 365/189.04, 230.05; 395/164, 165, 166, 115, 116, 725, 275; 360/35.1

[56] References Cited

U.S. PATENT DOCUMENTS

| | | | |
|---|---|---|---|
| 4,647,986 | 3/1987 | Vaughn et al. | 360/35.1 |
| 4,918,664 | 4/1990 | Platt | 365/230.05 |
| 5,062,081 | 10/1991 | Runaldue | 365/189.04 |
| 5,065,368 | 11/1991 | Gupta et al. | 365/230.05 |
| 5,142,540 | 8/1992 | Glasser | 365/189.04 |
| 5,179,667 | 1/1993 | Iyer | 395/275 |
| 5,193,193 | 3/1993 | Iyer | 395/725 |

*Primary Examiner*—Mark R. Powell
*Assistant Examiner*—U. Chauhan
*Attorney, Agent, or Firm*—Craig J. Lervick; George A. Leone, Sr.

[57] ABSTRACT

A display memory system consisting of a controller and a display memory that has a read display memory cycle time that is a non-integer multiple of the write display memory update rate. The display memory being partitioned into two frames of display memory with each frame having a plurality of subframes. The controller consisting of a read display memory decoder, a read display memory next subframe generator a read display memory latch and consisting of a write display memory decoder, a write display memory next subframe generator and write display memory latch.

27 Claims, 5 Drawing Sheets

GERBIL WHEEL MEMORY

BACKGROUND OF THE INVENTION

This invention relates to a display memory system and, more particularly, to a display memory system wherein the write display memory rate and read display memory update rate are non-integer multiples of each other, alternately known as a Gerbil Wheel Memory (GWM).

Prior art display memories cannot have a read rate and a write rate which are non-integer multiples of each other. For example, it may be advantageous to write a memory buffer with video data at an update rate of 20 Hz, while simultaneously reading video data from the same buffer at an update rate of 66 Hz. A conventional PING/PONG video memory in which the input and output update rates are integer multiples of one another (for example having a 30 Hz input rate and a 60 Hz output rate) is not a feasible solution.

A conventional PING/PONG memory configuration utilizes two full frames of dual port random access memory (RAM). The frame being updated is called write display memory. The frame being displayed is called read display memory. The write display memory device writes to one frame while a read display memory device simultaneously and synchronously reads from the other. When both devices have finished their respective memory accesses, which will occur at the same time, the read display memory device then reads from the frame previously written to by the write display memory device, and the write display memory device begins writing to the frame previously read by the read display memory device. This configuration is adequate only when the input writing rate and output reading rate are integer multiples of one another. If the frame rates are not integer multiples of one another, the update rate of the read display memory device will approach the output rate of the write display memory device, resulting in loss of data or overwriting of data.

Prior art solutions have not addressed the particular problem of input and output rates that are not equal or not equal multiples of each other. Current display memory systems demand that the write update rate be slaved to the input video source or to the rate the display requires. As a result, most, if not all current systems, use a PING/PONG configuration.

SUMMARY OF THE INVENTION

It is an object of the present invention to provide the capability, in a display memory system, to read from display memory at a non-integer multiple of the rate at which the display memory is updated.

It is a further object of the invention to allow simultaneous access by write display memory and read display memory devices to the same frame of memory in a display memory system.

It is a further object of the invention to allow synchronous input/output operations to be performed, with no restrictions on the rates at which these operations are performed.

It is yet another object of the invention to provide a system having a display system read frame rate which is independent of the write frame rate of an input source.

The gerbil wheel memory (GWM) provided by the present invention solves the problems present in the prior art by partitioning each frame of memory into subframe blocks which can be controlled independently. Like the PING/PONG configuration, the GWM uses two full frames of dual port RAM. The GWM, however, allows the write display memory device and read display memory device to access a part of each frame simultaneously. This means that both devices can act on different parts of the same frame at the same time.

The GWM as embodied in one example of the invention utilizes a video memory. The memory is organized as two full frames of dual port RAM. Each frame is divided into subframes. Each subframe is of equal size and can be any fraction of the entire frame, such as ½ frame, ¼ frame, . . . down to a single pixel. Input/output operations occur on subframes. This allows the write display memory and read display memory devices to access the same frame at the same time, allowing the update rate of the read display memory device to be independent of the update rate of the write display memory device. The input and output update rates become independent because neither read or write devices have to wait to gain access to a frame.

Steps are taken to ensure that the read display memory device and the write display memory device do not interfere with one another. Before reading from a particular frame, a controller checks to see if the read display memory device will catch up with the write display memory device and thus read inconsistent display data (e.g., a subframe that is not completely rewritten). If the read device will catch the write device, the read device is instructed to go back and read from the previous frame for a second time.

Other objects, features and advantages of the present invention will become apparent to those skilled in the art through the Description of the Preferred Embodiment, Claims, and Drawings herein.

BRIEF DESCRIPTION OF THE DRAWINGS

To illustrate the invention, a preferred embodiment of this invention will be described hereinafter with reference to the accompanying drawings, in which.

DESCRIPTION OF THE PREFERRED EMBODIMENT

Figure 1:
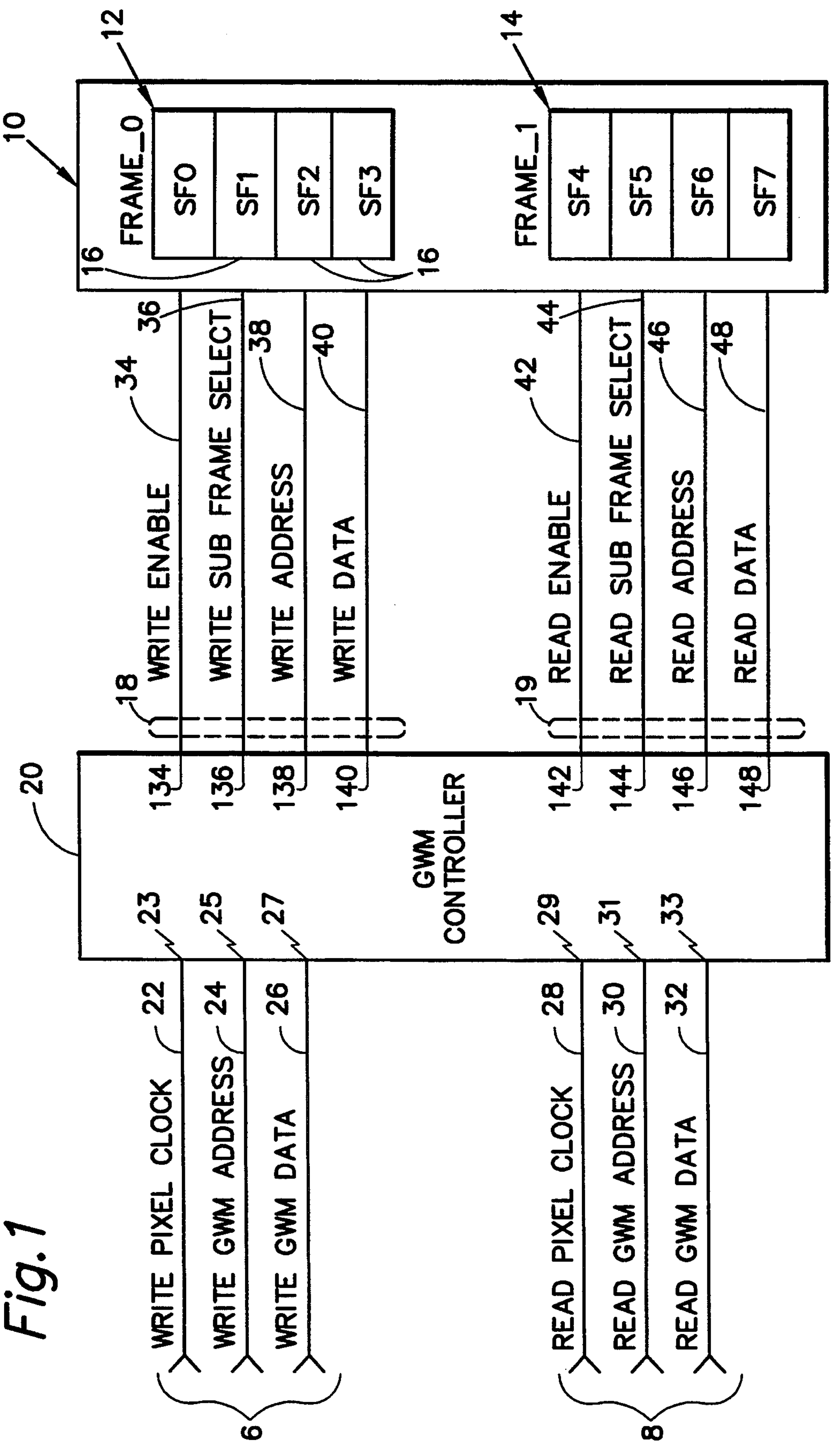
FIG. 1 hows a high level diagram of the GWM display memory circuitry including the partitioning of the GWM memory system by dividing display memory into frames and subframes.

Referring now to FIG. 1, a block diagram of one embodiment of the GWM invention is shown comprising a GWM controller 20 and a display memory or a dual port display memory 10. The GWM controller receives input signals on two communication buses, a write communication bus 6 and a read communication bus 8. Each bus carries three signals. The first GWM controller input signal is received on the write pixel clock line 22 and is generated by a system utilizing the GWM, such as a computer based display system (not shown). Pixel clock line 22 is connected to controller 20 at a write pixel clock port 23. The second GWM controller signal is received on the write GWM address bus 24 and comprises the address of the pixel being written. This signal is received at a write GWM address port 25. The third GWM controller signal is received on the write GWM data bus 26 and comprises the content or value of the pixel being written. The data on write GWM data bus 26 is received on a write GWM data port 27. The fourth GWM controller signal is received on the read pixel clock line 28 and again is generated by the system utilizing the GWM. Read pixel clock line 28 is connected to GWM controller 20 at a read pixel clock port 29. The fifth GWM controller signal is received on the read GWM address bus 30 and comprises the address of the pixel being read. Read GWM address bus is connected to GWM controller at a read GWM address port 31. The sixth GWM controller signal is received on the read GWM data bus 32 and comprises the content or value of the pixel being read. Read GWM data bus 32 is connected to GWM controller at a read GWM address port 33.

The GWM controller is connected at its output portion to a dual port display memory 10 by two communication buses, a first communication bus 18 and a second communication bus 19. The dual port display memory 10 is divided into two frames; FRAME_0 12, and FRAME_1 14. Each frame 12 & 14, then is divided into subframes 16. In the present embodiment the frames are each divided into four subframes 16. Each frame of the dual port contains one full screen of display information. All information sent to dual frame display memory 10 is generated by the GWM controller 20.

Connected between GWM controller 20 and dual port display memory 10 are first communication bus 18 and second communication bus 19 which each are comprised of a number of control lines for reading from and writing to dual port display memory 10. The control lines within first communication bus 18 include a write enable line 34, a write subframe select line 36, a write address bus 38 and a write data bus 40. Similarly, the control lines within second communication bus 19 include a read enable line 42, a read subframe select line 44, a read address bus 46, and a read data bus 48. GWM controller 20 utilizes these connections to communicate with dual port display memory 10.

First communication bus 18 is connected to controller 20 at the appropriate output port. Specifically, write enable line 34 is connected at a write enable port 134, write subframe select line 36 is connected at a write subframe select port 136, write address bus 38 is connected at a write address port 138, and write data bus 40 is connected at a write data port 140. Similarly, second communication bus 19 is connected to controller 20 at the appropriate output parts. Specifically read enable line 42 is connected at a read enable port 142, read subframe select line 44 is connected at a read subframe select port 144, read address bus 46 is connected at a read address port 146, and read data bus 48 is connected at a read data port 148. Dual port memory 10 has similar connections to facilitate communication by first communication bus 18 and second communication bus 19.

Figure 2:
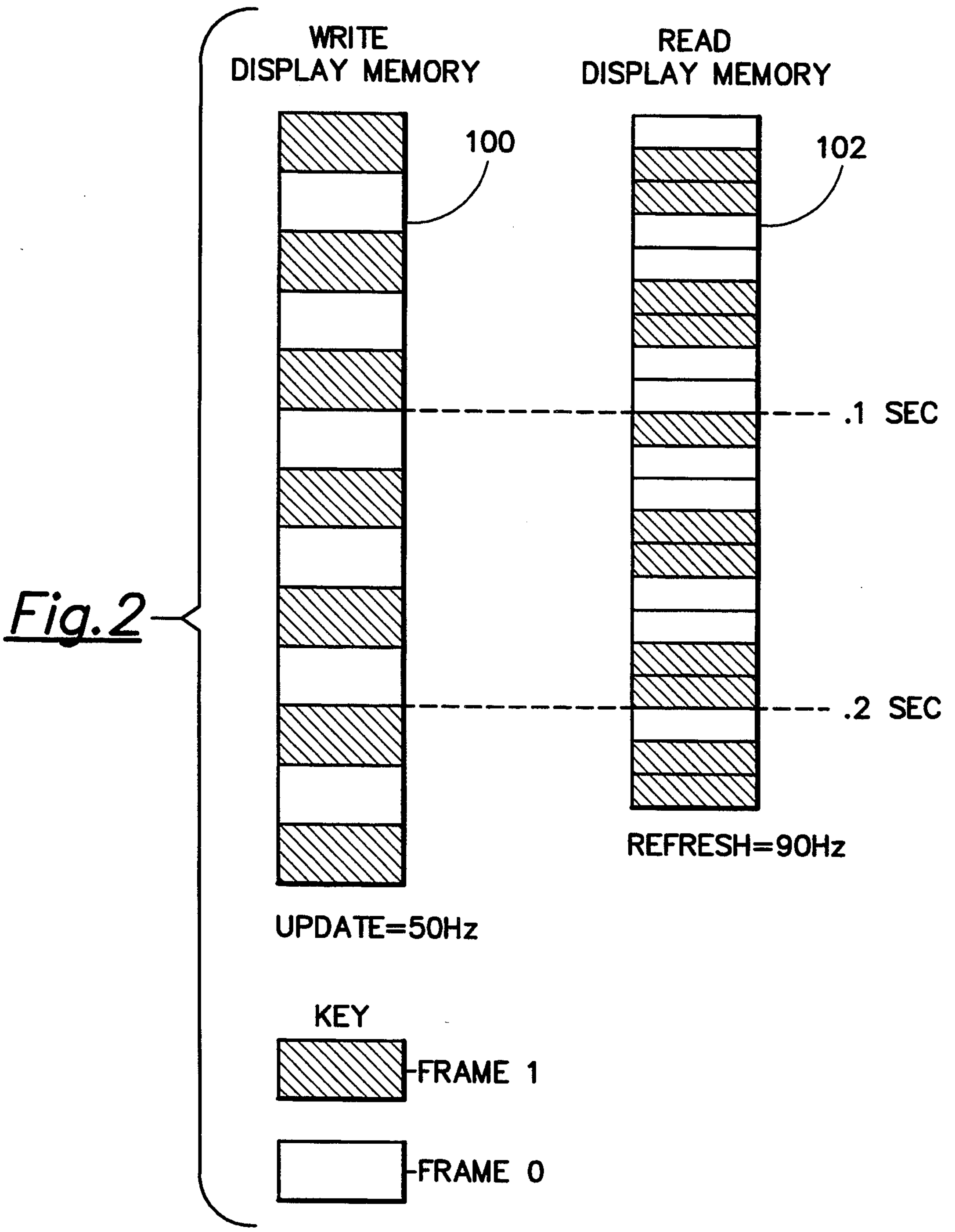
FIG. 2 shows an example of read and write cycles in relation to time for the GWM.

Referring now to FIG. 2, an example of GWM operation is depicted by a chart depicting operation mode v. time In the present example the write display memory has a frame rate of 50 Hz. as shown in write display memory bar graph 100 and the read display memory has a frame rate of 90 Hz as shown in read display bar graph 102. Each block in write bar graph 100 represents a write cycle and each block in read bar graph 102 represents a read cycle. As shown in FIG. 2, in the time it takes the write display memory device to write to FRAME_0, the read display memory device can read from FRAME _1 1.75 times. As can also be seen in the figure, the write display memory device writes to each frame consecutively. The read display memory device operates differently. When the read display memory device finishes reading a frame, it must determine if it should move to the next frame and read it or read from the same frame again. This decision is based on the current status of the write display memory device, the writing rate of the write display memory device and the reading rate of the read display memory device. In summary, the read display memory device ensures that it will not "catch" the write display memory device, causing the display of incomplete and inconsistent data. This process is described in further detail later in the present description.

For the example in FIG. 2, at the end of 0.1 second the write display memory has written to FRAME_0 three times and FRAME_1 twice. In the same period of time, the read display memory has read FRAME_0 five times and FRAME_1 four times. This is due to different write and read update rates.

A PASCAL program that determines which subframe to read based on the system time is shown in Table 1 below.

TABLE 1

```
if (time = nextr) then
  begin
    if (pr <> 3) or (pr <> 7) then pr := Pr +1
      else if (pr=3) then
        begin
          if (ps(time) = 4) or
             (ps(time + Tr) = 5) or
             (ps(time + 2*Tr) = 6) or
             (ps(time) + 3*Tr) =7) then pr :=0
            else pr :=4;
          end
      else if (pr = 7) then
        begin
          if (ps(time) = 0) or
             (ps(time + tr) = 1) or
             (ps(time + 2*tr) = 2) or
             (ps(time + 3*tr) = 3) then pr :=4
            else pr:= 0;
          end;
  end;
```

The program variables are defined as follows:

ps: Write Pointer—Pointer to subframe being accessed by the write display memory device.

pr: Read Pointer—Pointer to subframe being accessed by the read display memory device ts: Time required for write display memory device to write to one subframe.

tr: Time required for read display memory device to read from one subframe.

time: Current time.

nextr: Time at which the read display memory device will access the next subframe.

At any given time, the subframe which the write display memory device is accessing can be determined from the following simple equation. The relationship between ps (the write pointer) and time is described by:

ps(time)=(Trunc(time/ts)) Mod 8

The term "(Trunc(time/ts))" determines how many subframes have been accessed up to this time. The term "Mod 8" limits PS to range from 0 to 7 with the module function. For example, if the input frame rate is 50 Hz, then ts would equal 20 ms. The relationship for PS to time shown above indicates that every 20 ms (ts) the subframe being accessed by the write display memory device increments by 1. When the write display memory device completes writing to SF7 it returns to SF0 and continues in a daisy chain fashion.

The calculation which determines which subframe the read display memory device accesses is somewhat more complicated since it is dependent not only on the current time, but also on which frames the write display memory device is accessing, and which frames the write display memory device will be accessing during the upcoming read cycle. The read display memory device is allowed to access the same display memory frame as often as is necessary which helps to insure that the read display memory device will not attempt to access a subframe that is currently being accessed by the write display memory device. The read display memory device will finish reading any frame it has started.

Referring now to the program in Table 1, Line 1 shows that the read pointer will change only if the read display memory device is finished reading the current subframe. In this program the dual port display memory contains two frames, each of which are broken into four subframes. The subframes within FRAME_0 are labeled SF0, SF1, SF2, and SF3. Similarly, the subframes in FRAME_1 are labeled SF4, SF5, SF6 and SF7. In the program in Table 1, the subframes are simply identified by numbers 0–7.

In line 3 of the program, the read pointer is incremented by 1 if the current subframe just read is not the last subframe of the current frame. This ensures that an entire frame is read before the read display memory device begins reading the other frame.

Lines 5–8 and 13–19 demonstrate the predictive nature of the algorithm. If the current subframe being accessed by the read device is the last subframe of the frame, then the write pointer is checked to see which frame the write display memory device will be writing to during the upcoming subframe read cycles. This satisfies the objective that both devices are not accessing the same subframe simultaneously. For example, line 4 tests whether the read pointer is on the last subframe of FRAME_0. If this condition is met, the write pointer is checked. Lines 6–9 test whether the writer pointer will be pointing at a subframe which could be read during the next read cycle. Line 6 tests whether the write pointer is current writing to subframe 4, and if so, it is not desired to have the read device read FRAME_1 so the read pointer is brought back to the beginning of FRAME_0. Line 7 tests whether the write pointer will be pointed at SF5 during the time in which the read device could access SF5. If this is satisfied, the read pointer is again directed back to the beginning of FRAME_0. Similar test are done in lines 8 & 9. Finally, if none of these tests are met, them the read device is free to access FRAME_1.

The GWM cycle time is derived from the access times of the memory devices themselves. Those skilled in the art will appreciate that it is desirable to have the fastest cycle times available within the limits of the chosen memory technology.

Figure 3A:
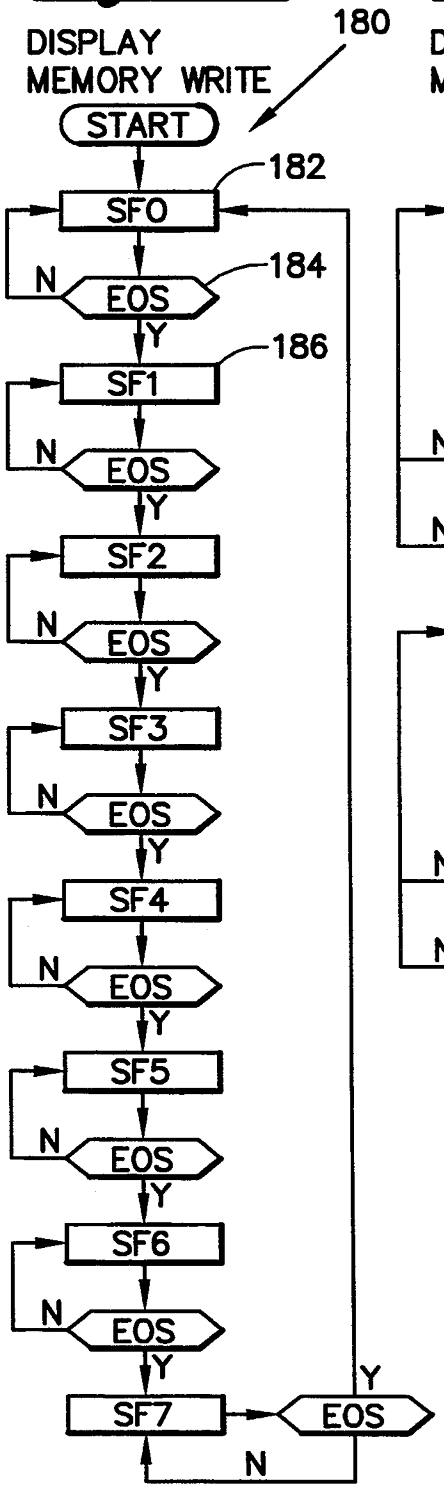
FIGS. 3A, 3B, 3C and 3D show a state machine diagrams of the operation of the preferred embodiment of the invention.

Referring now to FIG. 3A, a write flow diagram 180 of the operation of the invention's display memory write process is shown. Generally, the write display memory device begins writing to subframe 0 (SF0) and sequentially writes to all of the other subframes (SF1 thru SF7). In the case of write flow diagram 180, the display memory write process begins at block 182 where subframe zero (SF0) is written to until the end of subframe signal (EOS) goes active at block 184. When the end of the subframe signal (EOS) is active, the next frame (SF1) is accessed at block 186 for writing. This process repeats until the end of subframe signal (EOS) is active for the final subframe (in this case, SF7), then SF0 is accessed again. The whole process repeats indefinitely.

Figure 3B:
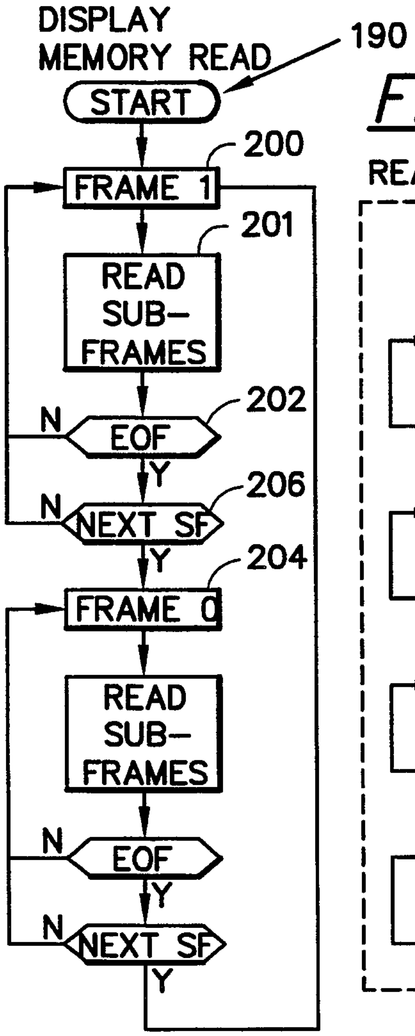

Referring now to FIG. 3B, a read flow diagram 190 of the operation of the invention's display memory read cycle is shown. The process starts at block 200 by reading from FRAME_1. Reading of FRAME_1 is accomplished by reading each subframe 201 until the End of Frame signal EOF is active at block 202. When the EOF is active, GWM must determine whether to move on to the next frame or read again from the same frame. This decision is made by the process in the next subframe (next SF) block 206. More detail of next subframe block 206 is discussed in conjunction with FIG. 3D.

Figure 3C:
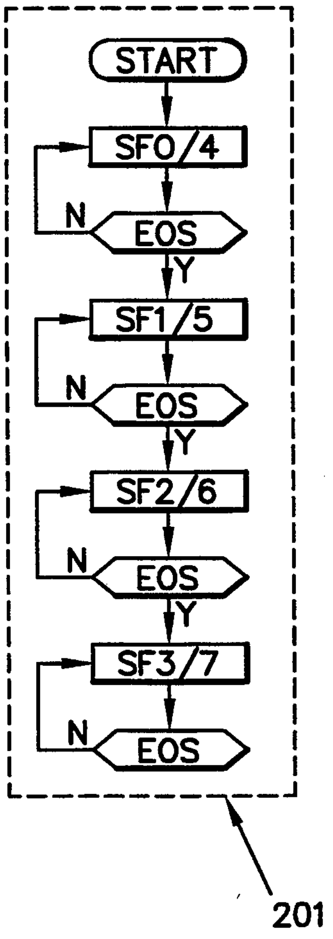

Referring now to FIG. 3C, a state machine diagram of the operation of the invention's display memory read subframes cycle is shown. Read subframes process 201 reads the appropriate subframes for the frame being accessed. If FRAME_0 is being read the process starts at subframe zero (SFO) then increments through subframe three (SF3). Similarly, if FRAME_1 is being read the process starts at subframe four (SF4) then increments through subframe 7 (SF7).

Figure 3D:
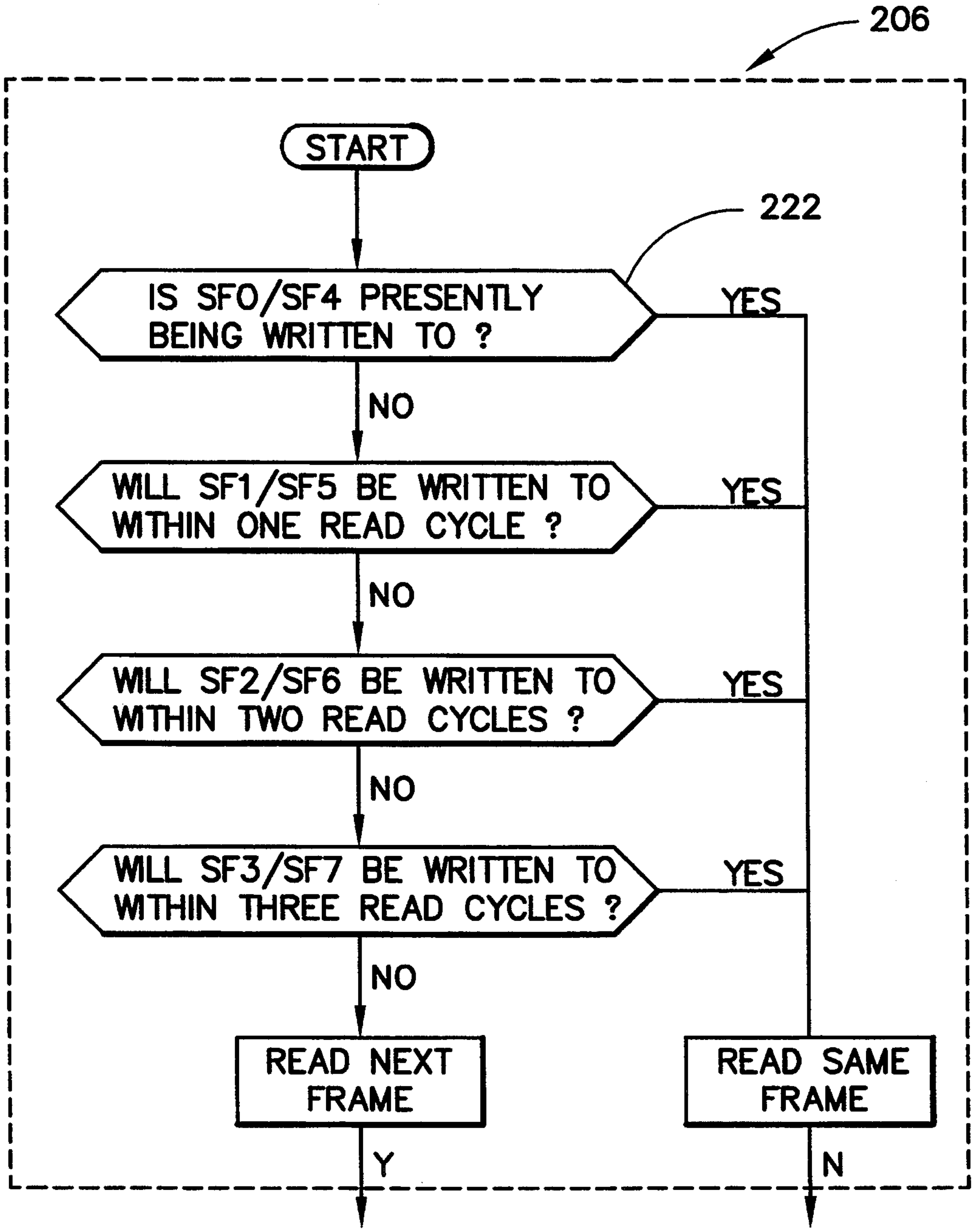

Referring now to FIG. 3D, a state machine diagram of the operation of the read next frame decision block 206 is shown. The process starts following an end of frame (EOF) indication by block 202. The state machine diagram 206 is shown generically to apply following the reading of FRAME_0 or FRAME_1. Therefore, both possible subframes are indicated where applicable (e.g. in the first block 222 of the process, "SFO/SF4" indicates that the process is polling SF0 if FRAME_1 was the last frame read and SF4 if FRAME_0 was the last frame read.) The process will be described as if FRAME_1 has just been read and next subframe block 206 is determining if FRAME_0 can now be read. It is understood that the same process is applicable following the vending of FRAME_0. The process must determine if the subframes of the next frame will be written to during the upcoming read cycles (i.e. will SF0–SF3 or SF4–SF7 be written to in the time in which the read device desires to read those subframes.) First it must be determined if SF0 is presently being written to (See block 222). If SF0 is currently being written to, then it is not desirable to read from SF0 also, therefore the read device should go back and read from same frame. If SF0 is not being written to, the process then asks if SF1 will be written to within one read cycle. If SF1 will be written to in the next read cycle, this indicates that the read device will catch up to the write device in one read cycle. Again, it would be undesirable to write to and read from the same subframe, therefore the read device is instructed to read the same frame again. If SF1 will not be written to within one read cycle, the process must move on and determine if SF2 will be written to within two read cycles. Again, if SF2 is to be written to within two read cycles, the read device would catch the write device and this is not desirable. If this condition exists, the read device should go back to read the same frame that was previously read. Next, it must be determined if SF3 will be written within three read cycles. This condition would also indicate that the read device would catch the write device, thus causing the system to read to and write from the same subframe. This should be avoided so the read device is instructed to read from the same frame that was previously read if this condition exists. Finally, if the system has gone through all of the previously mentioned tests and determined that the read device can move on to the next frame without catching the write device, the system is instructed to read from the next frame. Appropriate signals are emitted from next frame block 206 to cause the display memory read process 190 to loop to the correct frame.

Again, this same process is applicable following the reading of FRAME_0, however subframes 4 thru 7 (SF4–SF7) are tested. As also previously discussed, those tests are to determine if the display memory read device 51 would catch up with the display memory write device 50, if the read device is instructed to read from the next frame.

Figure 4:
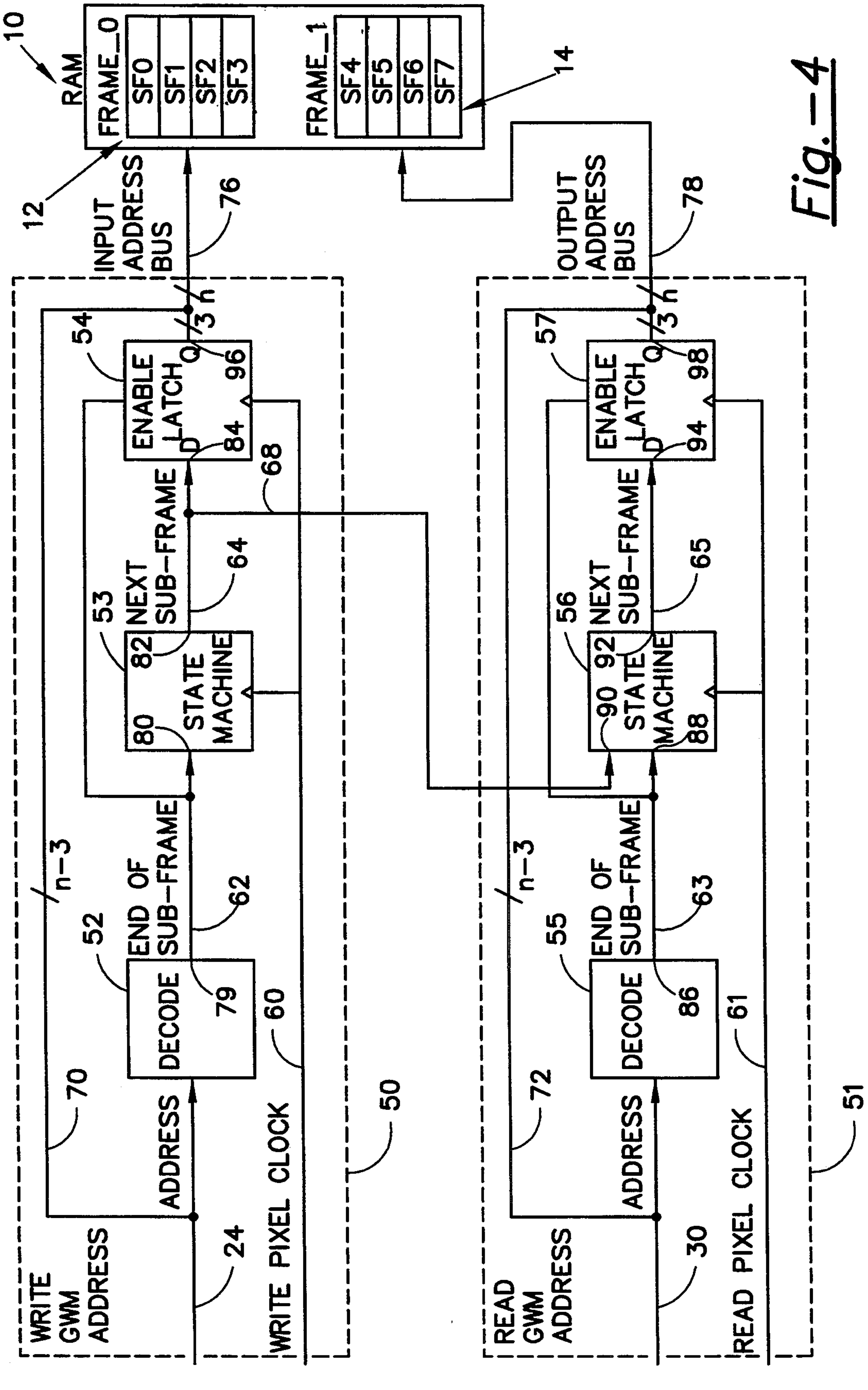
FIG. 4 illustrates, in more detail, the GWM read and write system components.

Now referring to FIG. 4, a more detailed block diagram of the GWM controller is shown. The GWM controller is comprised of two sets of circuitry, one for an input apparatus or write GWM address device 50 which writes to display memory 10, and one for an output apparatus, or read GWM address device 51 which reads display memory 10.

The block of circuitry which writes to display memory 10 consists of a write address decoder 52, write state machine 53, and a write enable latch 54. The system write GWM address bus 24 is connected to an input of 58 write address decoder 52. The system write GWM address bus 24 is also connected by line 70 to an output 96 of write enable latch 54. The write address decoder 52 decodes the write memory addresses received on write GWM address bus 24 to determine if these addresses are the last subframe address in the subframe currently being accessed. Write decoder 52 generates a write end of subframe signal on an output 81 which is connected to an input 80 of write state machine 53 via line 62. If the write memory address is the last address within the current subframe, write address decoder 52 enables state machine 53 and write latch 54. Write state machine 53 generates the next subframe signal on an output 82 which is connected to an input 84 of write enable latch 54 via line 64.

The block of circuitry which reads from display memory 10 consists of a read address decoder 55, a read state machine 56, and a read enable latch 57 The system read GWM address bus 30 is connected to an input 59 of read address decoder 55. The system read GWM address bus 36 is also connected to an output 98 of read enable latch 57 by line 72. Read address decoder 55 decodes the read memory addresses, received on read GWM 30 to determine if these addresses are the last subframe address in the subframe currently being accessed. Read decoder 55 generates end of subframe signals on an output 86, which is connected to an input 88 of read state machine 56 via line 63. If the read memory address is the last address in the subframe, decoder 55 enables state machines 56 and latch 57. Further, read state machine 56 receives a signal a second input 90 from the write state machine on line 68. Second input 90 can indicate which subframe is being written to by the write GWM address device 50. Read state machine 56 that generates a next subframe signal on an output 92 which is connected to an input 94 of read enable latch 57 via line 65.

State machines 53 and 56 output next subframe signals which are consistent with the logic previously discussed. Specifically, the write state machine 53, increments the next subframe signal so as to allow input apparatus 50 to begin writing to subframe zero (SF0) and sequentially step through each subframe of the memory. As previously discussed, when the write device reaches subframe seven (SF7) the GWM loops steps back to subframe zero (SF0). This process was previously described with reference to FIG. 3A.

Read state machine 56 similarly controls the reading from display memory 10. State machine 56 outputs the appropriate signals on line 64 to allow the read device to implement the logic previously discussed with reference to FIGS. 3B, 3C & 3D.

Write GWM address device 50 and read GWM address device 51 are synchronized via write pixel clock 22 on line 60 and read pixel clock 28 on line 61. Those skilled in the art will note that synchronization of the pixel clocks transmitted on lines 60 and 61 and the size of display memory 10 depend on each specific implementation.

Write enable latch 54 produces a signal on an output 96 latch output 96 is connected with line 70 wherein the output bits from write enable latch 54 are concatenated with the address transmitted on line 70 to fan the full input address bus 76.

Similarly, read enable latch 57 produces a signal on an output 98. Latch output 98 is connected with line 72 wherein the signals on output 98 and line 72 are concatenated with the address on line 72 to fan the full output address bus 78.

Input address bus 76 and output address bus 78 contain all the necessary addressing required to write to and read from dual port display memory 10. With reference to FIG. 1, input address bus 76 includes write enable input 34, write subframe select 36, and write address bus 38. Similarly, output address bus 78 includes read enable input 42, read subframe select 44 and read address bus 46.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, can be accomplished without departing from the scope of the invention itself.

What is claimed is:

1. A display memory apparatus for use with a graphic display system, which avoids the simultaneous reading from and writing to a single memory location, comprising;

a memory means for storing data wherein the memory means is partitioned into two frames of memory, each of the frames for storing data for a single display screen, and wherein the frames are each partitioned into a plurality of subframes;

a memory controller means coupled to the memory means by a first communication bus and a second communication bus, the memory controller means further coupled to the graphic display system by a write communication bus and a read communication bus, the memory controller means for controlling a transfer of data between the graphic display system and the memory means where the graphic display system has a read rate and a write rate which are not integer multiples of one another, the memory controller means controls the transfer of data by directing the transfer of data to assure that the data is not read from a subframe which is currently being written to.

2. The display memory apparatus of claim 1 wherein the memory controller means further comprises:

a write address means for receiving a write address signal on the write communication bus and producing an input address signal on the first communication bus which identifies the frame and the subframe to be written to wherein each frame is alternately written to and each subframe within the frame is written to consecutively; and a read address means for receiving a read address signal on the read communication bus and producing an output address signal on the second communication bus which identifies the frame and subframe to be read from, wherein the read address means tests the input address signal and a write clock signal received on the write communication bus to determine which subframe is currently being written to by the write address means and which subframes will be written to during a subsequent read cycle and then produces the output address signal to assure that the write address means and the read address means will not be addressing the same subframe within the next read cycle.

3. The display memory apparatus of claim 2 wherein the write address means comprises a write address decoder, and a write state machine wherein the write address decoder receives the input address signal and produces an end of subframe signal on a decoder output if the write address is a last address of a partitioned subframe, the write state machine receives the end of subframe signal from the write decoder on an input and produces a next subframe address on a write state machine output which is connected to the memory means via the first communication bus.

4. The display memory apparatus of claim 3 wherein the read address means comprises a read address decoder, and a read state machine wherein the read address decoder receives the read address signal and produces an end of subframe signal on a read address decoder output if the read address is the last address of a partitioned subframe, and wherein the read state machine receives the end of subframe signal from the read address decoder on a first input and also receives the next subframe address from the write state machine on a second input, the read state machine then produces a next subframe address on a read state machine output which is connected to the memory means via second communication bus.

5. The display memory apparatus of claim 1 wherein the frames of memory are partitioned into four subframes.

6. The display memory system of claim 4 wherein the read state machine will output an address corresponding to the next subframe within the frame unless the subframe currently being read is the last subframe within its frame, wherein if the subframe currently being read is a last subframe within its frame, the read state machine will output an address corresponding to a first address of the subframe currently being read if the read address and the write address will be the same during a subsequent read cycle, and wherein if the subframe currently being read is the last subframe of its frame, and the read address and the write address will not be the same during the subsequent read cycle, the read state machine will output an address corresponding to the first subframe of the frame not presently being read.

7. The memory display device of claim 1 wherein the write communication bus comprises a write pixel clock line, a write address bus, and a write data bus.

8. The memory display device of claim 1 wherein the read communication bus comprises a read pixel clock line, a read address bus, and a read data bus.

9. The memory display device of claim 1 wherein controller means is a microprocessor.

10. A display memory apparatus for use with a graphic display system, which avoids the simultaneous reading from and writing to a single memory location, a memory means for storing data having a first addressing port, a second addressing port, a first data port, and a second data port, wherein the memory means is partitioned into a plurality of frames of memory and each frame is partitioned into a plurality of subframes;

a memory controller means having a write addressing port for receiving addressing signals from the graphic display system, a write data port for receiving data from the graphic display system, a read addressing port for receiving read addressing signals from the graphic display system, a read data port for transmitting data to the graphic display system, an input address port connected to the first addressing port for transmitting address signals to the memory means, an input data port connected to the first data port for transmitting data to the memory means, an output address port connected to the second addressing port for transmitting address signals to the memory means, and an output data port connected to the second data port for receiving data from the memory means, the memory controller means for receiving write address signals on the write address port and producing an input address signal on the input address port which identifies a specific frame and a specific subframe within the memory means to which the write data signal is to be stored, the memory controller means also for receiving read address signals on the read address port and producing an output address signal on the output address port which identifies a specific frame and a specific subframe within the memory means from which data is to be retrieved, wherein the memory controller means will control the output address signals so as to assure that the input data will be written to and the output data will be read from different subframes.

11. The display memory apparatus of claim 10 wherein the memory controller means further comprises:

a write address means for receiving the write address signal and producing the input address signal which identifies the frame and subframe to be written to wherein each frame is written to consecutively and each subframe within the frame is written to consecutively; and a read address means for receiving the read address signal and producing the output address signal which identifies the frame and subframe to be read from wherein the read address means tests the input address signal and an input clock signal to determine which subframe is currently being written to by the write address means and which subframes will be written to during the next read cycle and then produces the output address signal such that the write address means and the read address means will not be addressing the same subframe within the next read cycle.

12. The display memory means apparatus of claim 10 wherein the memory is partitioned into two frames.

13. The display memory apparatus of claim 10 wherein the frames of memory are partitioned into four subframes.

14. The display memory apparatus of claim 12 wherein the frames of memory are partitioned into four subframes.

15. The display memory apparatus of claim 11 wherein the write address means comprises a write address decoder, and a write state machine wherein the write address decoder receives a write address on an input from the graphic display system and produces an end of subframe signal on an output if the write address is a last address within a partitioned subframe, the write state machine receives the end of subframe signal from the write decoder on an input and produces a next subframe address on a write state machine output which is connected to the first addressing port of the memory means.

16. The display memory apparatus of claim 15 wherein the read address means comprises a read address decoder, and a read state machine wherein the read address decoder receives a read address on an input from the graphic display system and produces an end of subframe signal on an output if the read address is the last address of a partitioned subframe, and wherein the read state machine receives the end of subframe signal from the read decoder on a first input and also receives the write next subframe signal from the write state machine on a second input, the read state machine then produces a next subframe address on a read state machine output which is connected to the second addressing port of the memory means.

17. The display memory apparatus of claim 16 wherein the memory is partitioned into two frames.

18. The display memory apparatus of claim 17 wherein the frames of memory are partitioned into four subframes.

19. The display memory of claim 18 wherein the write state machine receives the end of subframe signal from the write decoder and:

a. if the specific subframe currently being written to is not the last subframe within the specific frame currently being written to the write state machine will produce a write next subframe signal which corresponds to the next subframe within the current frame of the memory means; and b. if the specific subframe currently being written to is the last subframe within the specific frame currently being written to the write state machine will produce a write next subframe signal which corresponds to the first subframe within the alternate frame.

20. The display memory of claim 19 wherein the read state machine receives the read end of subframe signal from the read decoder and the write next subframe signal from the write state machine and:

a. if the read address signal read by the read address decoder was not the last address of a partitioned subframe corresponding to the last subframe of a current frame, the read state machine produces the read next subframe address signal corresponding with the next subframe within the current frame in sequential order; and b. if the read address signal read by the address decoder was the last address of a partitioned subframe corresponding to the last subframe of the current frame, the read state machine checks the write next subframe address signal and the input clock signal and, if the write address means could address a subframe in the alternate frame at the same time the read addressing means could address that subframe, then the read state machine produces a read next subframe signal which corresponds with the first subframe in the current frame; and c. if the last read next subframe signal was the address of the last subframe of the current frame, the read state machine checks the write next subframe address and the input clock signal and if the write address means could not address a subframe in the alternate frame at the same point in time time the read addressing means could address that same subframe, then the read state machine produces an read next subframe signal which corresponds with the first subframe in the alternate frame.

21. The display memory system of claim 10 wherein the memory controller means further comprises a read pixel clock port for receiving a read pixel clock signal from the graphic display system.

22. The display memory system of claim 10 wherein the memory controller means further comprises a write pixel clock port for receiving a write pixel clock signal from the graphic display system.

23. A display memory system for use with a graphic display system, comprising a memory means for storing data having an input addressing port, an input data port, output addressing port, and an output data port, wherein the memory means is partitioned into a first frame of memory and a second frame of memory and wherein the first frame of memory is partitioned into a first subframe, a second subframe, a third subframe, and a fourth subframe, and the second frame of memory is partitioned into a fifth subframe, a sixth subframe, a seventh subframe and an eighth subframe; and a memory control means having a read addressing port for receiving read addressing signals from the graphic display system, a read data port for transmitting data to the graphic display system, a write addressing port for receiving write addressing signals from the graphic display system, a write data port for receiving data from the graphic display system, the memory control means further having a control means input address port connected to the memory means input address port for transmitting an input address signal to the memory means, a control means input data port connected to the memory means input data port for transmitting data to the memory means, a control means output address port connected to the memory means output address port for transmitting an output address signal to the memory means, and a control means output data port connected to the memory means output data port for receiving data from the memory means, the memory controller means for controlling a transfer of data to and from the memory means such that data can be written to the memory means and read from the memory means simultaneously and the memory controller further for assuring that data is not written to a subframe which data is concurrently being read from.

24. The display memory apparatus of claim 23 wherein the memory controller means further comprises:

a write address means for receiving the write address signal and producing the input address signal which identifies the frame and subframe to be written to wherein each frame is written to consecutively and each subframe within the frame is written to consecutively; and a read address means for receiving the read address signal and producing the output address signal which identifies the frame and subframe to be read from wherein the read address means tests the input address signal and an input clock signal to determine which subframe is currently being written to by the write address means and which subframes will be written to during a subsequent read cycle and then produces an appropriate output address signal to assure that the write address means and the read address means will not be addressing the same subframe within the next read cycle.

25. The display memory apparatus of claim 24 wherein the write address means comprises a write address decoder, and a write state machine wherein the write address decoder receives a write address on an input from the graphic display system and produces an end of subframe signal on an output if the write address corresponds to a final address within a partitioned subframe, the write state machine receives the end of subframe signal from the write decoder on an input and produces a next subframe address on a write state machine output which is connected to the first addressing port of the memory means.

26. The display memory apparatus of claim 25 wherein the read address means comprises a read address decoder, and a read state machine wherein the read address decoder receives a read address on an input from the graphic display system and produces an end of subframe address on an output if the read address is the last address of a partitioned subframe, and wherein the read state machine receives the end of subframe signal from the read decoder on a first input and also receives the write next subframe signal from the write state machine on a second input, the read state machine then produces a next subframe address on a read state machine output which is connected to the second addressing port of the memory means.

27. A process for controlling the storage and retrieval of data from a memory wherein the memory is partitioned into two frames of memory and each frame is partitioned into a plurality of subframes, comprising the steps of:

a. writing data to the frames of memory wherein each frame is alternately written and wherein each frame is written to by sequentially writing to each subframe at a writing rate;

b. reading data from the frame of memory which is not being written to, wherein the data is read at a reading rate which is not equal to nor an integral multiple of the writing rate and wherein each frame is read by sequentially reading each subframe within that frame;

c. checking to determine if any subframe in the frame of memory which was not last read from will be written to during an upcoming reading cycle at an identical point in time that subframe could be read from;

d. reading from the frame of memory which was not last read from if no subframe within that frame will be written to at the same time that subframe could be read; and e. reading from the frame of memory last read from if any subframe in the frame last read from will be written to at the same time that frame could be read.

* * * * *

UNITED STATES PATENT AND TRADEMARK OFFICE

CERTIFICATE OF CORRECTION

PATENT NO. : 5,388,208

DATED : February 7, 1995

INVENTOR(S) : Thomas A. Weingartner, Paul J. Short, Paul E. Knight, and Jennifer A. Graves It is certified that error appears in the above-identified patent and that said Letters Patent is hereby corrected as shown below:

Column 11, line 8, after "memory" insert --means--.

Column 14, line 7, cancel "signal" and substitute "address".

Signed and Sealed this

Thirtieth Day of April, 1996

Attest:

BRUCE LEHMAN

Attesting Officer

Commissioner of Patents and Trademarks